US012584353B2

(12) United States Patent
Childress

(10) Patent No.: US 12,584,353 B2
(45) Date of Patent: Mar. 24, 2026

(54) MOTORIZED WINDOW COVERING SYSTEM AND METHOD

(71) Applicant: Draper, Inc., Spiceland, IN (US)

(72) Inventor: Clint Childress, Spiceland, IN (US)

(73) Assignee: Draper, Inc., Spiceland, IN (US)

( * ) Notice: Subject to any disclaimer, the term of this patent is extended or adjusted under 35 U.S.C. 154(b) by 352 days.

(21) Appl. No.: 18/372,407

(22) Filed: Sep. 25, 2023

(65) Prior Publication Data

US 2024/0102341 A1 Mar. 28, 2024

Related U.S. Application Data

(60) Provisional application No. 63/410,476, filed on Sep. 27, 2022, provisional application No. 63/526,401, filed on Jul. 12, 2023.

(51) Int. Cl.

| | |
|---|---|
| ***E06B 9/72*** | (2006.01) |
| ***E06B 9/42*** | (2006.01) |

(52) U.S. Cl.

CPC . *E06B 9/72* (2013.01); *E06B 9/42* (2013.01)

(58) Field of Classification Search

CPC ...... E06B 9/68; E06B 2009/6818; E06B 9/72; E06B 9/42; E06B 9/32; E06B 9/322; E06B 2009/6827; E06B 9/44; E06B 2009/6809; E06B 2009/6845; H04L 12/283

See application file for complete search history.

(56) References Cited

U.S. PATENT DOCUMENTS

| | | | | |
|---|---|---|---|---|
| 6,975,203 | B2 * | 12/2005 | Brookbank | G07C 9/00817 340/5.71 |
| 7,434,353 | B2 * | 10/2008 | Nien | E06B 7/086 49/82.1 |
| 7,839,109 | B2 * | 11/2010 | Carmen, Jr. | H02P 7/29 318/466 |
| 9,267,327 | B2 | 2/2016 | Feldstein | |
| 9,366,082 | B2 | 6/2016 | Feldstein | |
| 9,732,553 | B2 * | 8/2017 | Rotchell | E06B 7/096 |
| 9,951,556 | B2 | 4/2018 | Newman, Jr. | |
| 10,017,985 | B2 * | 7/2018 | Lundy | E06B 9/68 |
| 10,119,330 | B2 | 11/2018 | Brunk et al. | |
| 10,202,801 | B2 | 2/2019 | Feldstein | |
| 10,358,869 | B2 | 7/2019 | Feldstein | |
| 10,920,491 | B2 | 2/2021 | Feldstein | |
| 10,961,774 | B2 * | 3/2021 | Boyd | E06B 9/32 |
| 10,968,697 | B2 * | 4/2021 | Lundy | E06B 9/68 |
| 2003/0159355 | A1 * | 8/2003 | Froerer | E06B 7/086 49/73.1 |
| 2004/0250964 | A1 * | 12/2004 | Carmen, Jr. | H05B 47/165 160/120 |
| 2005/0173080 | A1 * | 8/2005 | Carmen, Jr. | E06B 9/68 160/310 |
| 2015/0362896 | A1 * | 12/2015 | Feldstein | E06B 9/72 700/275 |

(Continued)

OTHER PUBLICATIONS

Kilbane, Kevin; Understanding the IEEE 802.3bt PoE Standard; skyworksinc.com; 9 pages; 2022.

*Primary Examiner* — Beth A Stephan
(74) *Attorney, Agent, or Firm* — Faegre Drinker Biddle & Reath LLP

(57) ABSTRACT

A motorized window covering control system is disclosed. Exemplary motorized window covering assemblies may be powered by a power panel over low voltage network cable.

20 Claims, 12 Drawing Sheets

(56) References Cited

U.S. PATENT DOCUMENTS

| | | | | |
|---|---|---|---|---|
| 2015/0368967 | A1* | 12/2015 | Lundy | E06B 9/68 160/5 |
| 2016/0047164 | A1* | 2/2016 | Lundy | E06B 9/68 160/5 |
| 2017/0241200 | A1* | 8/2017 | Feldstein | E06B 9/68 |
| 2017/0356243 | A1* | 12/2017 | Feldstein | H02J 7/0024 |
| 2019/0032404 | A1 | 1/2019 | Chacon et al. | |
| 2019/0356508 | A1* | 11/2019 | Trikha | G02F 1/163 |
| 2020/0284091 | A1 | 9/2020 | Turner et al. | |
| 2021/0032082 | A1 | 2/2021 | Chacon et al. | |
| 2022/0070019 | A1 | 3/2022 | Hebeisen | |
| 2022/0341256 | A1* | 10/2022 | Casey | E06B 9/264 |
| 2024/0318500 | A1* | 9/2024 | Blair | E06B 9/68 |

* cited by examiner

MOTORIZED WINDOW COVERING SYSTEM AND METHOD

RELATED APPLICATIONS

This application claims the benefit of U.S. Provisional Application No. 63/410,476, filed Sep. 27, 2022, titled MOTORIZED WINDOW COVERING SYSTEM AND METHOD, and U.S. Provisional Application No. 63/526,401, filed Jul. 12, 2023, titled MOTORIZED WINDOW COVERING SYSTEM AND METHOD, the entire disclosures of which are expressly incorporated by reference herein.

FIELD OF THE DISCLOSURE

The present disclosure relates to systems and methods for managing a plurality of window covering devices, and in particular a plurality of window covering devices which are responsive to various inputs.

BACKGROUND OF THE DISCLOSURE

Motorized window covering devices are generally known. Such window covering devices permit an operator to control a single window covering automatically or with a remote control as opposed to manually. Conventional motorized window covering may receive commands to move their respective window coverings over a wired connection or a wireless connection. Further, conventional motorized window coverings include DC motors to move their respective window coverings and may be powered by battery power at the motorized window covering, with AC power provided to the motorized window covering and converted to DC power, or with DC power that is supplied over a cable. Problem with conventional motorized window coverings which provide DC power over a cable is that they either require specialized cabling thereby increasing the cost of installation and/or are of limited power reducing the separation distance between exemplary motorized window coverings and the source of the DC power.

SUMMARY

The present disclosure provides systems and methods for powering and/or managing a plurality of motorized window covering devices over at least one network.

In an exemplary embodiment of the present disclosure, a system is disclosed. The system comprising: a plurality of low voltage network cables, each network cable having a first end, a second end, a plurality of electrical lines running from the first end to the second end, the plurality of electrical lines including a first number of power lines and a second number of data lines; a plurality of motorized window covering assemblies, each of the plurality of motorized window covering assemblies including a window covering input port couplable with a respective one of the plurality of low voltage network cables, a moveable window covering having a plurality of positions, a drive system to move the moveable window covering to a respective one of the plurality of positions; and a motorized window covering controller which controls the drive system, the drive system including a DC motor and a DC-DC converter; and a power panel having a plurality of window covering output ports, the plurality of window covering output ports being couplable to the plurality of low voltage network cables such that a first low voltage network cable couples the window covering input port of a first motorized window covering to the power panel and a second low voltage network cable couples the window covering input port of a second motorized window covering to the power panel independent of the window covering input port of the first motorized window covering. The power panel provides a first DC voltage greater than 24 volts to the first motorized window covering through a first group of connectors in a first window covering output port of the plurality of window covering output ports connected to the first number of power lines of the first low voltage network cable of the plurality of low voltage network cables. The DC-DC converter of the first motorized window covering receives a second DC voltage from the first number of power lines of the first low voltage network cable. The second DC voltage being lower than the first DC voltage. The DC-DC converter of the first motorized window covering provides a third DC voltage of about 24 volts to power the motor of the first motorized window covering, the second DC voltage being greater than the third DC voltage. A length of the first low voltage network cable being greater than 300 feet. The power panel provides instructions to the motorized window covering controller of the first motorized window covering through a second group of connectors in the first window covering output port of the plurality of window covering output ports connected to the first number of data lines of the first low voltage network cable of the plurality of low voltage network cables.

In an example thereof, the first DC voltage is about 36 volts.

In another example thereof, the second voltage has a first value corresponding to the length of the first low voltage network cable being a first length and a second value corresponding to the length of the first low voltage network cable being a second length, the second length being longer than the first length and the second value being less than the first value.

In a further example thereof, the first number of power lines of the first low voltage network cable includes a plurality of pairs, the plurality of pairs being electrically coupled in parallel within the first motorized window covering. In a variation thereof, the plurality of pairs includes at least two pairs. In a further variation thereof, the plurality of pairs includes three pairs. In still another variation thereof, the first low voltage network cable includes eight lines. In yet still another variation thereof, the first low voltage network cable is one of a CAT-5 cable and a CAT-6 cable.

In another exemplary embodiment of the present disclosure, a system is disclosed. The system comprising: a plurality of low voltage network cables, each network cable having a first end, a second end, a plurality of electrical lines running from the first end to the second end, the plurality of electrical lines including a first number of power lines and a second number of data lines, the first number being at least four; a plurality of motorized window covering assemblies, each of the plurality of motorized window covering assemblies including a window covering input port couplable with a respective one of the plurality of low voltage network cables, a moveable window covering having a plurality of positions, a drive system to move the moveable window covering to a respective one of the plurality of positions; and a motorized window covering controller which controls the drive system, the drive system including a motor and a DC-DC converter; and a power panel having a plurality of window covering output ports, the plurality of window covering output ports being couplable to the plurality of low voltage network cables such that a first low voltage network cable couples the window covering input port of a first motorized window covering to the power panel and a second low voltage network cable couples the window covering input port of a second motorized window covering to the power panel independent of the window covering input port of the first motorized window covering. The power panel provides a first DC voltage to the first motorized window covering through a first group of connectors in a first window covering output port of the plurality of window covering output ports connected to the first number of power lines of the first low voltage network cable of the plurality of low voltage network cables. The DC-DC converter of the first motorized window covering receives a second DC voltage from the first number of power lines of the first low voltage network cable. The DC-DC converter of the first motorized window covering provides a third DC voltage lower than the second DC voltage to power the motor of the first motorized window covering. The power panel provides the first DC voltage to the second motorized window covering through a second group of connectors in a second window covering output port of the plurality of window covering output ports connected to the first number of power lines of the second low voltage network cable of the plurality of low voltage network cables. The DC-DC converter of the second motorized window covering receives a fourth DC voltage from the first number of power lines of the second low voltage network cable. The fourth DC voltage being less than the second DC voltage and higher than the third DC voltage. The DC-DC converter of the second motorized window covering provides the third DC voltage to power the motor of the second motorized window covering.

In another exemplary embodiment of the present disclosure, a system is disclosed. The system comprising: a plurality of motorized window covering assemblies, each of the plurality of motorized window covering assemblies including a moveable window covering having a plurality of positions and a drive system to move the moveable window covering to a respective one of the plurality of positions, the drive system including a motor; a plurality of window covering active devices operatively coupled to the plurality of motorized window covering assemblies; and at least one controller operatively coupled to the plurality of window covering active devices and the plurality of motorized window covering assemblies. The at least one controller being configured to move a first movable window covering of a first motorized window covering assembly of the plurality of motorized window covering assemblies to a first position in response to a first input from a first window covering active device of the plurality of window covering active devices with a first constant speed of the motor of the first motorized window covering assembly and to move the first movable window covering of the first motorized window covering assembly of the plurality of motorized window covering assemblies to a second position in response to a second input from a second window covering active device of the plurality of window covering active devices with a second constant speed of the motor of the first motorized window covering assembly, the second constant speed being greater than the first constant speed.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
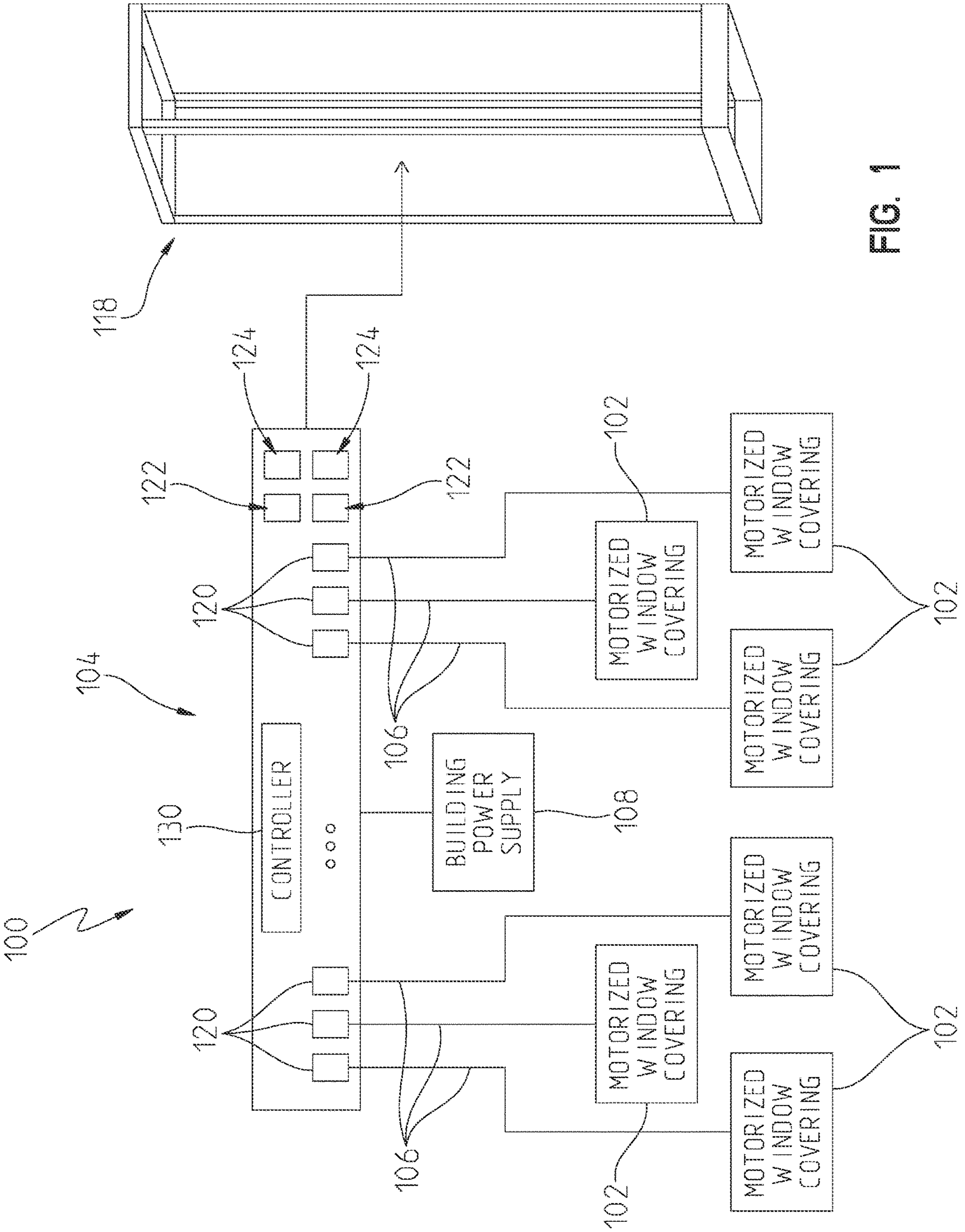
FIG. 1 illustrates an exemplary power panel and a standard IT rack.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components, inputs, and other items. Such use is not intended to denote an ordering of the components. Rather, numeric terminology is used to assist the reader in identifying the component being referenced and should not be narrowly interpreted as providing a specific order of components.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

The present disclosure relates to systems and methods for controlling a network of motorized window covering devices each having respective exemplary window coverings. Exemplary window coverings include shades, blinds, screens, and other suitable materials that may be positioned over windows to alter an illumination characteristic within an interior space of an environment. In one example, the window coverings may be positioned on either the interior side of the window or the exterior side of the window.

As used herein, the term "logic" includes software and/or firmware executing on one or more programmable processors, application-specific integrated circuits, field-programmable gate arrays, digital signal processors, hardwired logic, or combinations thereof. Therefore, in accordance with the embodiments, various logics may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein.

Referring now to FIG. 1, a system 100 for powering and controlling a plurality of motorized window covering assemblies 102 is shown. Each of the motorized window covering assemblies 102 are coupled to a power panel 104 through a low voltage network cable 106. Power panel 104 receives power from a building power supply 108, such as a 120 volt (V) AC outlet, and converts it to a DC power which is supplied to motorized window covering assemblies 102 over the respective low voltage network cables 106.

Exemplary motorized window covering assemblies 102 include roller shades, roman blinds, venetian blinds, and other suitable assemblies which are movable to alter an amount or direction of light that enters an interior space of a building.

Figure 2:
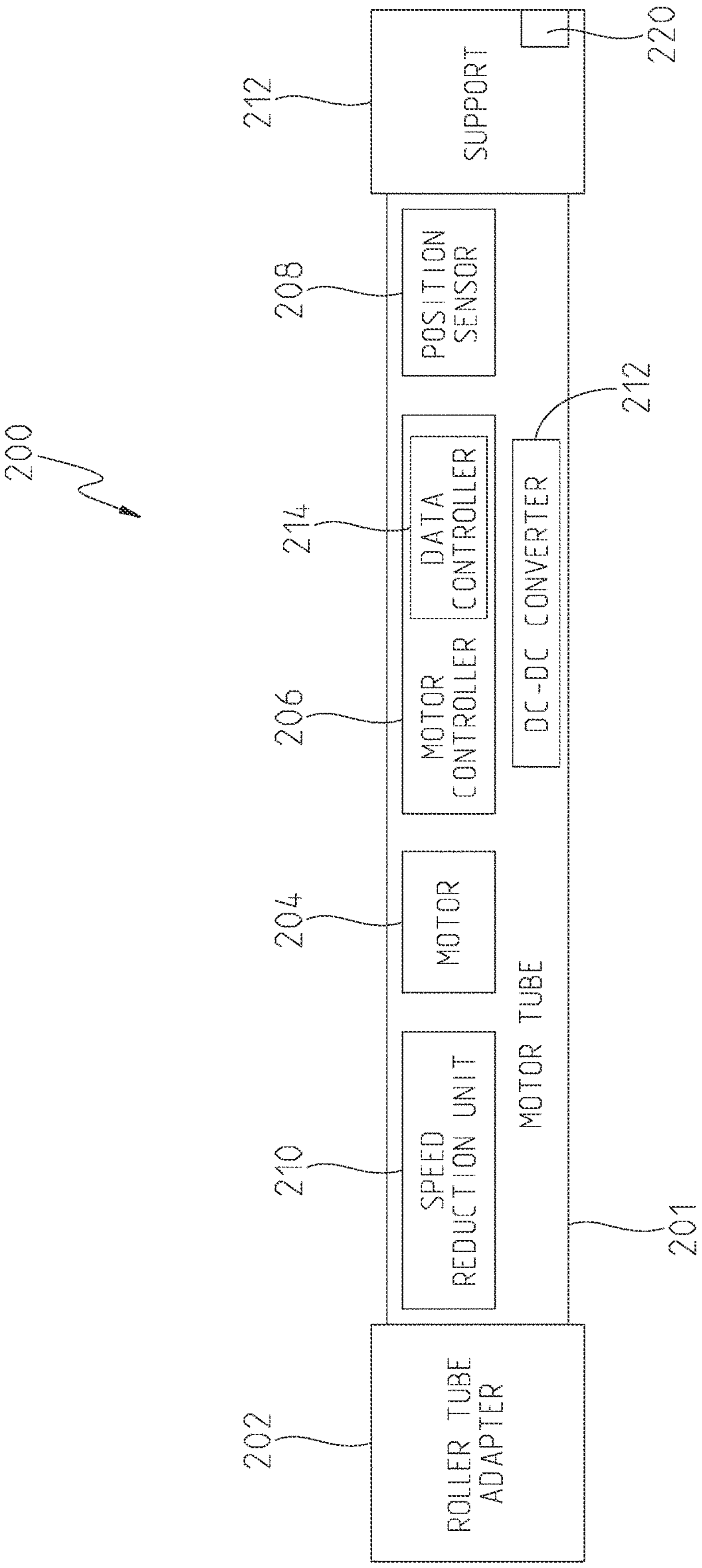
FIG. 2 illustrates a representative view of an exemplary motorized window covering assembly.
Figure 3:
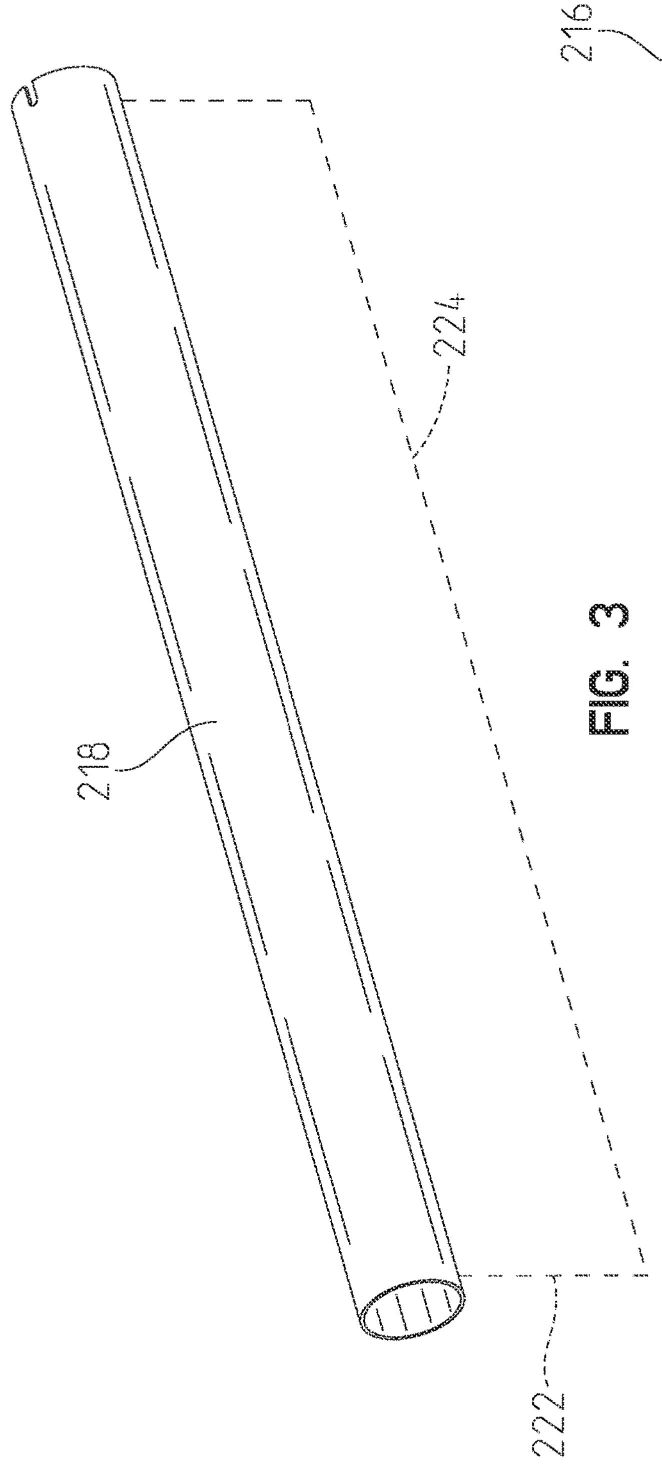
FIG. 3 illustrates a perspective view of a tubular sleeve of the exemplary motorized window covering assembly of FIG. 2.
Figure 4:
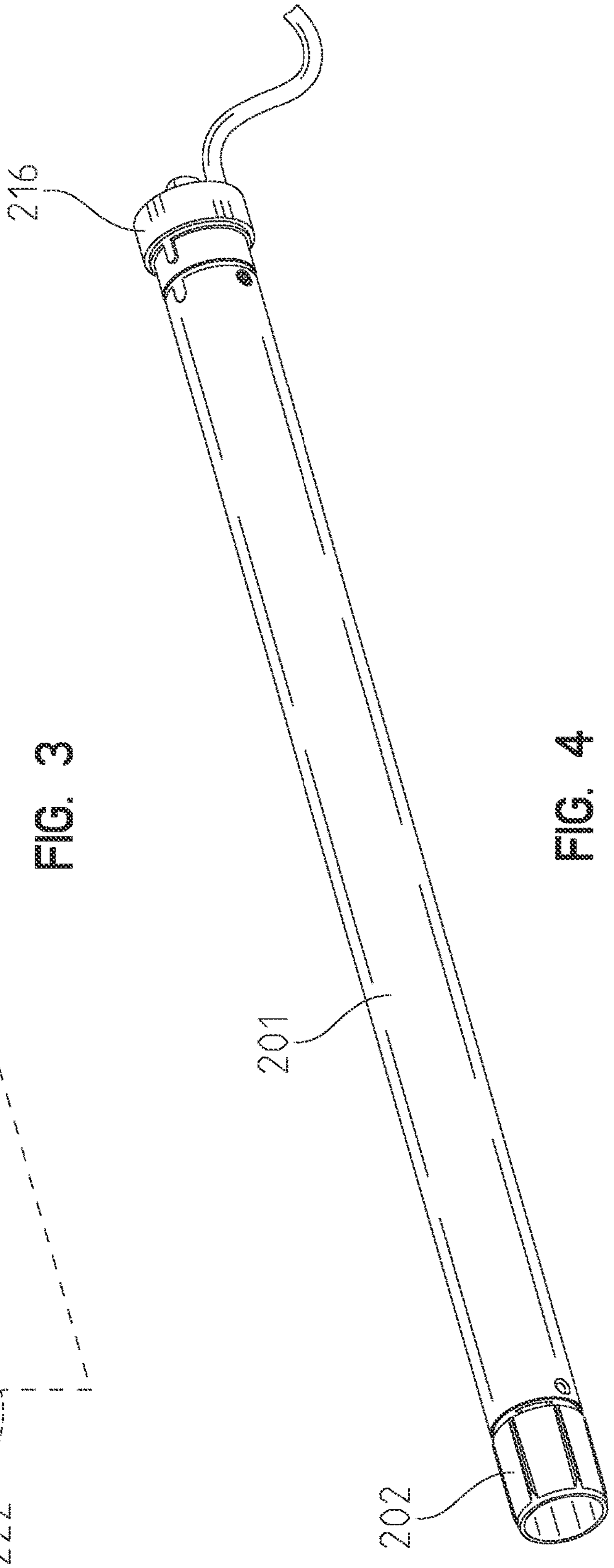
FIG. 4 illustrates a perspective view of a tubular motor roller of the exemplary motorized window covering assembly of FIG. 2.
Figure 5:
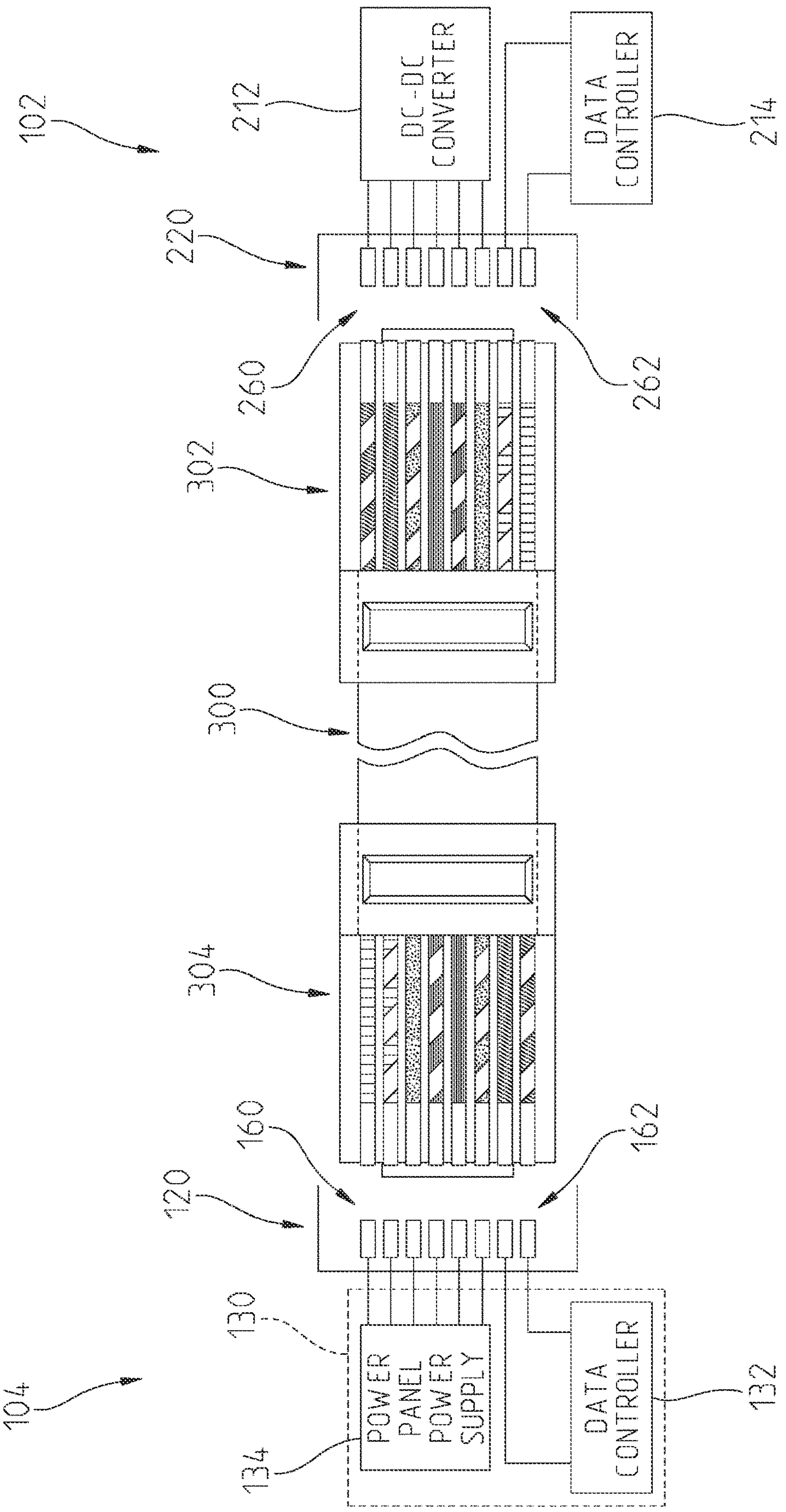
FIG. 5 illustrates a representative view of an exemplary connection between a power panel port and a port of a motorized window covering assembly.

With reference to FIGS. 2-4, an exemplary motorized window covering assembly 102 is illustrated. In the illustrative embodiment, motorized window covering assembly 102 is a motorized shade 200, and includes a motor tube 201 coupled to a roller tube adapter 202 at a first end and a support 216 at a second end. Motor tube 201 generally houses a motor 204, a motor controller 206 operatively coupled to motor 204, a position sensor 208, a speed reduction unit 210, and a DC-DC converter 212. A low voltage network cable 300 (see FIGS. 5 and 6) is removably coupled to a window covering input port 220 of first motorized window covering 200. Referring to FIG. 5, low voltage network cable 300 includes a plug 302 which is removably coupled to window covering input port 220. Referring to FIG. 2, window covering input port 220 is provided in support 216 of motorized shade 200.

A roller tube 218 is received over roller tube adapter 202 and motor tube 201. Roller tube adapter 202 rotates roller tube 218 relative to motor tube 201. Roller tube adapter 202 is rotated by motor 204 through speed reduction unit 210. Exemplary speed reduction units 210 include planetary gearsets. A moveable window covering 222 is coupled to roller tube 218 and may be rolled onto roller tube 218 or unrolled from roller tube 218 due to a rotation of roller tube adapter 202 to raise or lower a bottom edge 224 of moveable window covering 222.

Motor 204 is powered by DC-DC converter 212 and controlled by motor controller 206. Motor controller 206 includes a data controller 214 which receives commands across low voltage network cable 300 and interprets those commands to instruct the raising or lowering of moveable window covering 222. Position sensor 208 monitors a position of bottom edge 224 of moveable window covering 222. Exemplary position sensors 208 include hall effect sensors which monitor a rotation of one of an output shaft of motor 204 or roller tube adapter 202 or another rotatable member that rotates proportionally to the movement of bottom edge 224 of moveable window covering 222.

Returning to FIG. 1, power panel 104 includes a plurality of window covering output ports 120 which each may removably receive a plug 304 of low voltage network cable 300. In one embodiment, power panel 104 includes six window covering output ports 120. In one embodiment, power panel 104 includes twelve window covering output ports 120. In addition, power panel 104 includes a plurality, illustratively two, of network ports 122 which receive a plug 304 of low voltage network cable 300 and are couplable to a shade network 400 (see FIG. 7) described further herein. An exemplary shade network may be the INTELLIFLEX brand shade control network available from Draper, Inc. located at 411 South Pearl Street in Spiceland, IN 47385. Further, in embodiments, power panel 104 includes a plurality, illustratively two, of network ports 124 which receive a plug 304 of low voltage network cable 300 and are couplable to a facility network 500 (see FIG. 7) described further herein.

Figure 1A:
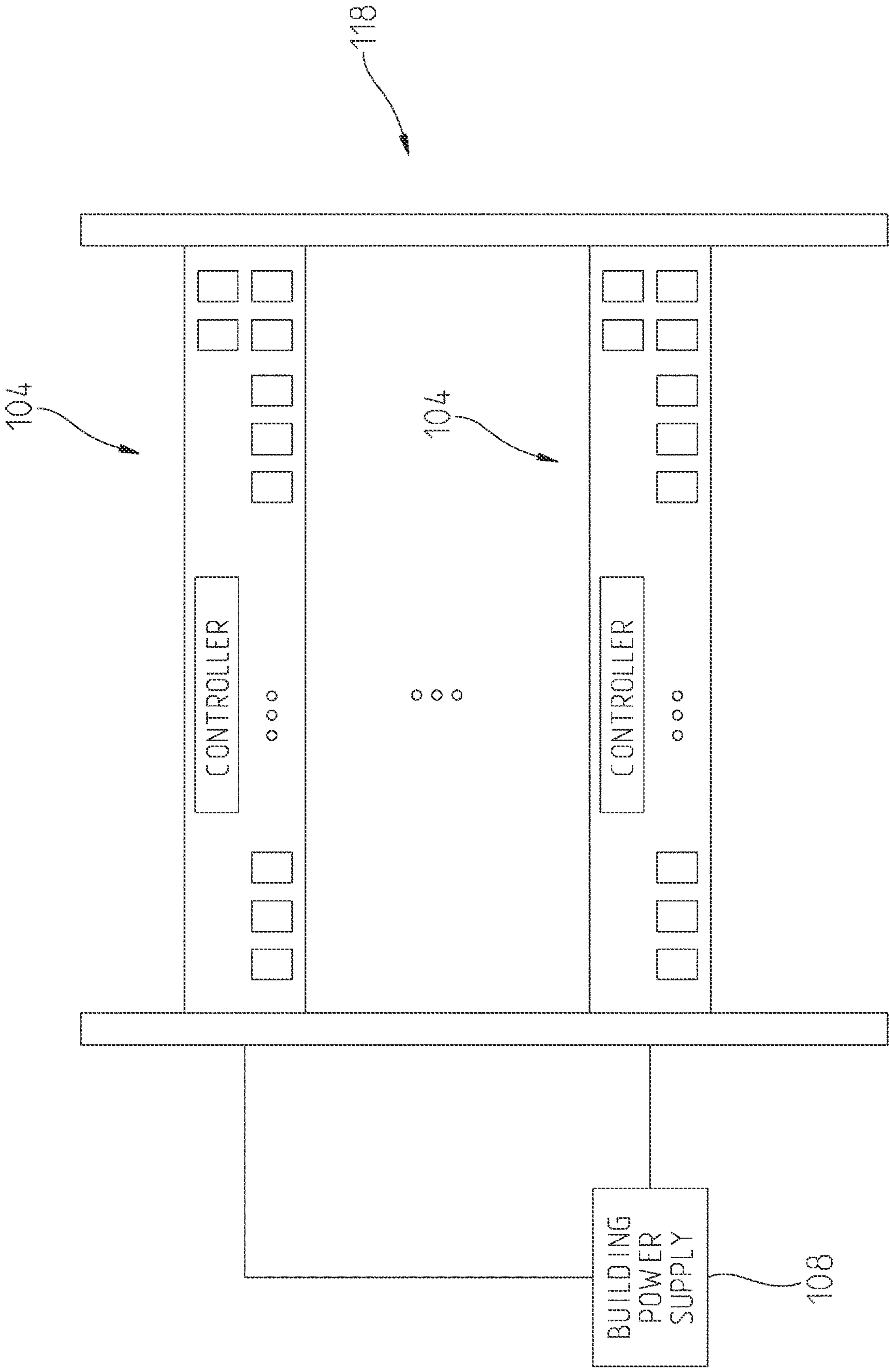
FIG. 1A illustrates a portion of an IT rack including multiple power panels.
Figure 8:
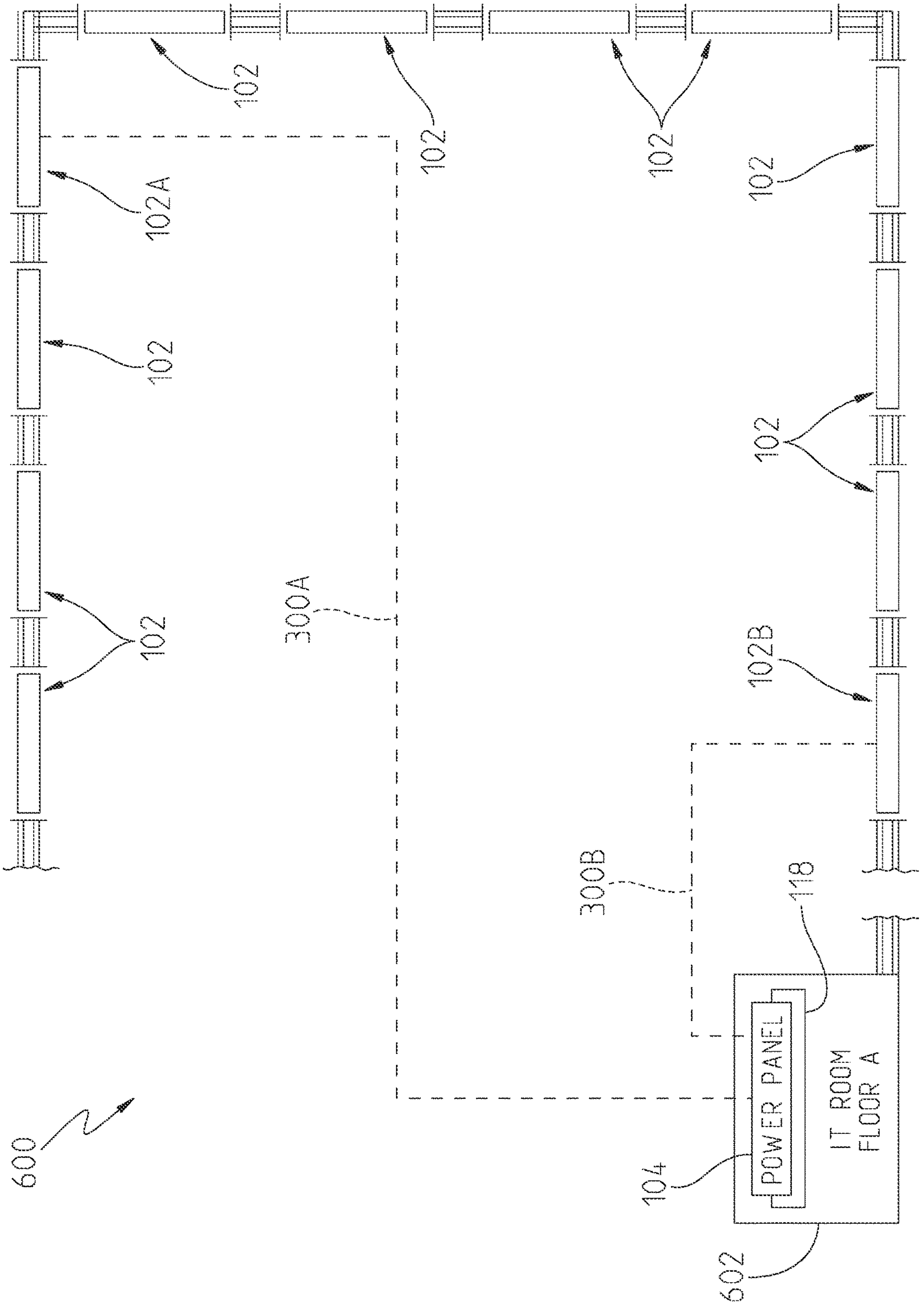
FIG. 8 illustrates an exemplary layout of motorized window coverings in a portion of a building of a facility.

Power panel 104 is sized and shaped to be mountable in a standard rack 118 (see FIG. 1) for IT components. In embodiments, power panel 104 is secured to standard rack 118 with fasteners (not shown) received in apertures (not shown) of standard rack 118. Referring to FIG. 1A, multiple instances of power panel 104 are shown coupled to standard rack 118. Referring to FIG. 8, standard rack 118 may be positioned in an IT room or closet 602 in a facility 600. Like other low voltage network cable 300 used to connect computer equipment throughout facility 600 to components mounted on standard rack 118 in closet 602, the low voltage network cable 300 used to connect motorized window covering assemblies 102 to power panel 104 may be routed through the ceiling, channels in the wall, or other points of access in facility 600. Two low voltage network cable 300, illustratively low voltage network cables 300A and 300B, are shown connecting two motorized window covering assemblies 102, illustratively motorized window covering assembly 102A and 102B, to power panel 104 in closet 602.

Power panel 104 converts power received from building power supply 108 into DC power for components coupled to window covering output ports 120 and network ports 122. A controller 130 of power panel 104 controls the interpretation of commands received through network ports 122 and/or network ports 124 and provides commands to the various motorized window covering assemblies 102 coupled to window covering output ports 120 through low voltage network cable 300 with a data controller 132. Controller 130 further includes a power panel power supply 134 which provides DC power to motorized window covering assemblies 102 coupled to window covering output ports 120 through low voltage network cable 300 and to components on shade network 400 through network ports 122.

Referring to FIG. 5, a connection from power panel 104 to a motorized window covering assemblies 102 over a low voltage network cable 300 is illustrated. Low voltage network cable 300 has a first plug 304 which is removably coupled to a window covering output port 120 of power panel 104 and a second plug 302 which is removably coupled to window covering input port 220 of a motorized window covering assembly 102. Window covering output ports 120 each includes a first group of connectors 160 which when plug 304 is coupled to window covering output ports 120 are connected to a corresponding number of lines of low voltage network cable 300 to transmit power to the respective motorized window covering assembly 102 and a second group of connectors 162 which when plug 304 is coupled to window covering output ports 120 are connected to a corresponding number of lines of low voltage network cable 300 to provide communication signals between power panel 104 and the respective motorized window covering assembly 102. Similarly, window covering input port 220 of a motorized window covering assembly 102 includes a first group of connectors 260 which when plug 302 is coupled to window covering input port 220 are connected to the same lines of low voltage network cable 300 coupled to power connectors 160 of the corresponding window covering output port 120 of power panel 104 to receive power from power panel 104 and a second group of connectors 162 which when plug 302 is coupled to window covering input port 220 are connected to the same lines of low voltage network cable 300 coupled to data connectors 162 of the corresponding window covering output port 120 of power panel 104 to provide communication signals between power panel 104 and motorized window covering assembly 102.

In embodiments, each of power connectors 160 of window covering output ports 120, power connectors 260 of window covering input port 220, and the corresponding number of lines in low voltage network cable 300 are at least four. In embodiments, each of power connectors 160 of window covering output ports 120, power connectors 260 of window covering input port 220 and the corresponding number of lines in low voltage network cable 300 are six, as illustrated in FIG. 5. In embodiments, each of power connectors 160 of window covering output ports 120, power connectors 260 of window covering input port 220, and the corresponding number of lines in low voltage network cable 300 are an even number. In embodiments, each of power connectors 160 of window covering output ports 120, power connectors 260 of window covering input port 220, and the corresponding number of lines in low voltage network cable 300 are at least 50% of the number of lines in the low voltage network cable 300. In embodiments, each of power connectors 160 of window covering output ports 120, power connectors 260 of window covering input port 220, and the corresponding number of lines in low voltage network cable 300 are 75% of the number of lines in the low voltage network cable 300. In embodiments, each of power connectors 160 of window covering output ports 120, power connectors 260 of window covering input port 220, and the corresponding number of lines in low voltage network cable 300 are at least 50% and up to 75% of the number of lines in the low voltage network cable 300.

Figure 6:
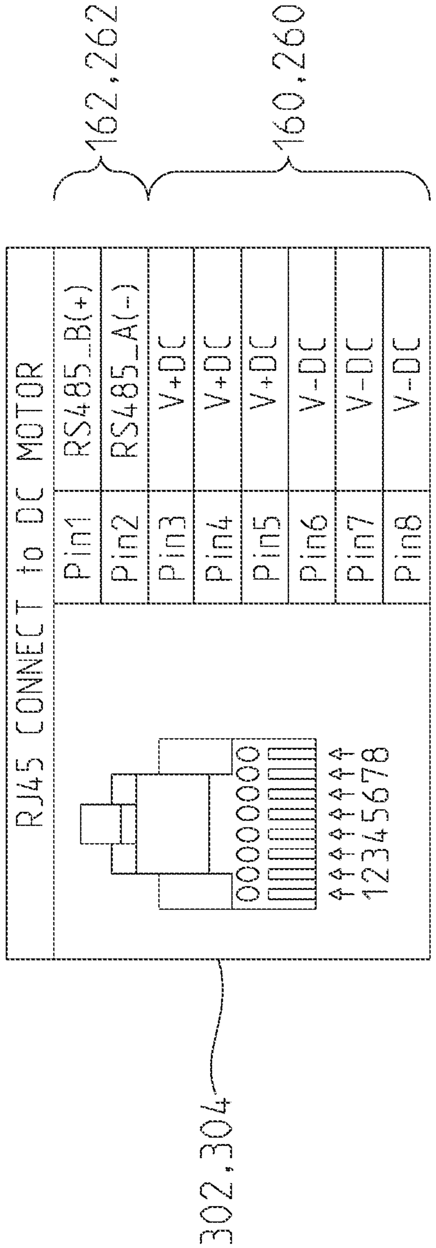
FIG. 6 illustrates a pin table for the connection of FIG. 5.

As shown in FIG. 6, in the illustrated embodiment, each of plug 302 and plug 304 includes two data lines which align with data connectors 162 of a window covering output port 120 (in the case of plug 304) and align with data connectors 262 of window covering input port 220 (in the case of plug 302) and six power lines which align with power connectors 160 of window covering output port 120 (in the case of plug 304) and align with power connectors 260 of window covering input port 220 (in the case of plug 302). As shown in FIG. 6, data controller 132 of power panel 104 and data controller 214 of motorized window covering assemblies 102 communicate over low voltage network cable 300 using an RS-485 protocol. Other exemplary network protocols may be used. Further, power panel power supply 134 places a positive first voltage on three of the lines of low voltage network cable 300 and uses three lines as a return. In the illustrated embodiment, the first DC voltage is 36 volts DC (V) at power panel 104. The voltage is reduced along the length of low voltage network cable 300 due to resistance of the cable to a second DC voltage at the window covering input port 220 of motorized window covering assemblies 102. DC-DC converter 212 receives the second voltage and steps it down to a third DC voltage. In embodiments, the second voltage is greater than 24 volts DC (V) and the third voltage is 24 volts DC (V).

Referring to FIG. 8, motorized window covering assembly 102B is connected to power panel 104 through low voltage network cable 300B which has a first length and motorized window covering assembly 102A is connected to power panel 104 through low voltage network cable 300A which has a second length, the second length being longer than the first length. Due to the difference in length, the DC voltage received by motorized window covering assembly 102B from power panel 104 over cable 300B is higher than the DC voltage received by motorized window covering assembly 102A from power panel 104 over cable 300A. In embodiments, each of the DC-DC converters 212 of motorized window covering assembly 102A and motorized window covering assembly 102B converts the received DC voltage to a common voltage level, such as 24 volts (V) to power the motors 204 of the respective motorized window covering assembly 102A and motorized window covering assembly 102B. An advantage, among others, of having a common voltage for each of the motors 204 of motorized window covering assemblies 102 is that the same control scheme may be used to operate the motors 204 at the same speed so that bottom edge 224 of each of moveable window covering 222 moves at the same speed. An exemplary control scheme is using pulse width modulation to control the speed of motors 204 which can be provided by power panel 104 to the motorized window covering assemblies 102.

In embodiments, the limitation on length of a low voltage network cable 300 between power panel 104 and motorized window covering assembly 102 is that the second voltage received at the motorized window covering assembly 102 stays above a threshold. In one embodiment, wherein the third voltage to be provided by DC-DC converter is 24 volts DC (VDC), the second voltage should be at least 25 volts DC (VDC). In embodiments, low voltage network cable 300 is a standard network cable, such as CAT-5 or CAT-6. In one example, using a standard CAT-5 network cable as low voltage network cable 300, power panel 104 provided 36 volts DC (VDC) to the pins indicated in FIG. 6 along a length of low voltage network cable of 900 feet and was able to provide the second voltage at the motorized window covering assembly 102 of at least 25 volts DC (VDC). In embodiments, power panel 104 may power motorized window covering assembly 102 over a length of low voltage network cable 300 exceeding 300 feet, 330 feet, 400 feet, 500 feet, 600 feet, 700 feet, 800 feet, and up to 900 feet. By increasing the voltage provided on pins 3-5 (see FIG. 6) the length of low voltage network cable may be further increased. In embodiments, the voltage provided on pins 3-5 is below 50 volts DC (VDC). In embodiments, the voltage provided on pins 3-5 is below 48 volts DC (VDC). In embodiments, the voltage provided on pins 3-5 is below 45 volts DC (VDC). In embodiments, the voltage provided on pins 3-5 is below 40 volts DC (VDC).

Figure 7:
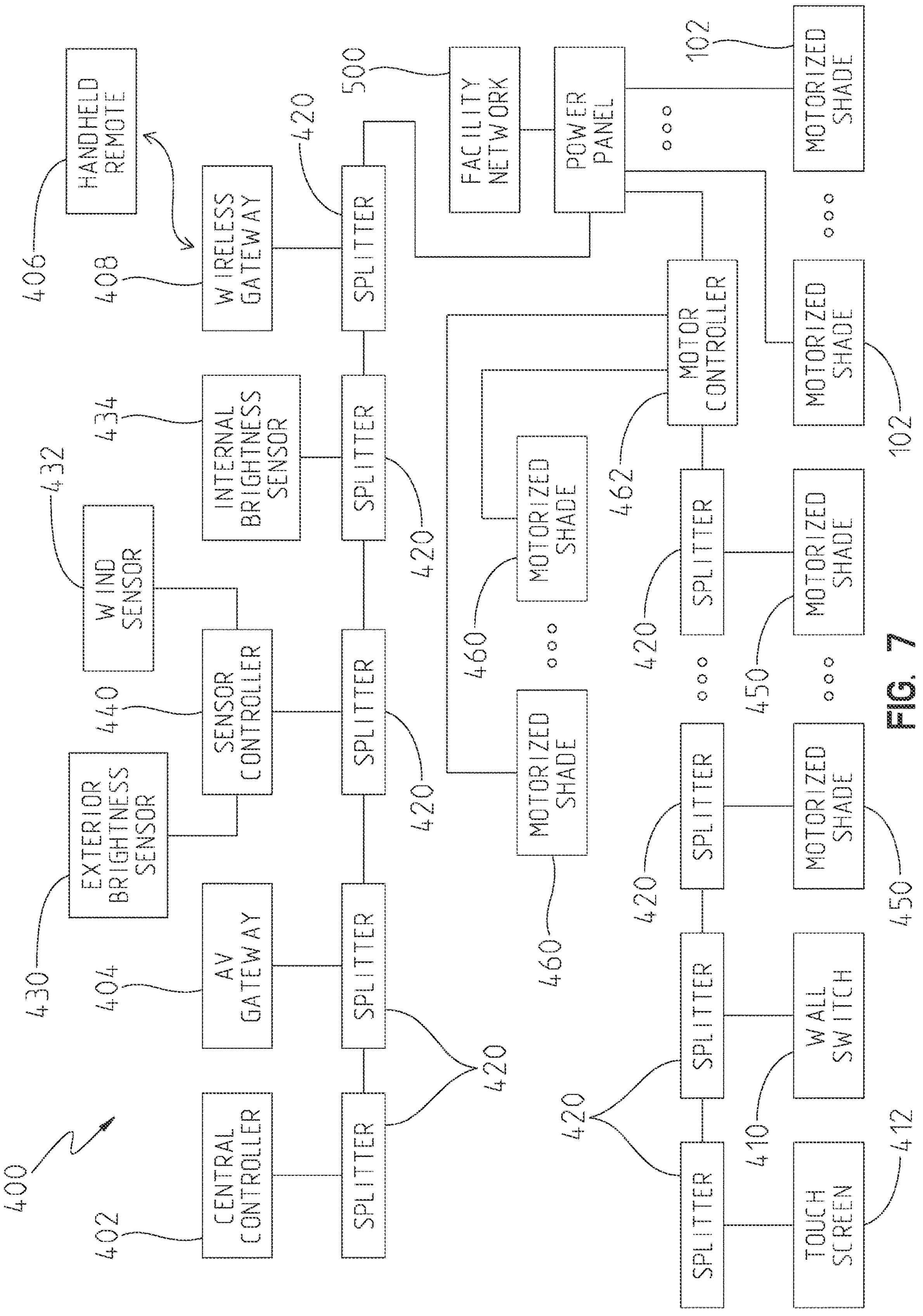
FIG. 7 illustrates a power panel coupled to an exemplary shade network and facility network.

Referring to FIG. 7, power panel 104 and motorized window covering assemblies 102 are connected to a facility network 500 and a shade network 400. Facility network 500 may include various components and systems. For example, facility network 500 may include a building management system, a heating and air conditioning system, a lighting system, a security system, and other suitable systems. Power panel 104 may receive instructions from one or more components or systems of facility network 500 for positioning motorized window covering assemblies 102 or other motorized window covering assemblies on shade network 400. For example, a building management system instead of turning on a furnace of the heating and air conditioning system may request motorized window covering assemblies 102 and/or other motorized window covering assemblies on shade network 400 be raised to allow more radiant heat into the interior of the building.

With reference to FIG. 7, an embodiment of a shade system 400 is provided with one or more window covering active devices. As used herein, the term "window covering active device" is defined as a control device which generates a command to move the window covering of at least one window covering passive device, such as motorized window covering assemblies 102. Exemplary control devices include wall switches, handheld remotes/wireless network gateways, touchscreens, AV gateways, central controllers, and/or controllers having logic to alter the position of the window coverings of the window covering passive devices based on one or more of illumination levels, energy savings, occupancy, glare, wind, presentation activation, time of day, sun position, and other suitable factors that may result in the logic issuing a command to alter the position of one or more window coverings of window covering passive devices.

In the illustrative embodiment, shade network 400 includes window covering active devices 104, namely central controller 402, an AV gateway 404, a handheld remote 406 and a wireless gateway 408, a wall switch 410, and a touch screen 412. In various embodiments, control circuit 106 may be wall switch 306, touch screen 308 and/or handheld remote 304 and wireless gateway 305, in addition to, or in place of commissioning controller 310. Each device of system 400 is coupled to the network through low voltage network cable 300 and a splitter 420 such that commands sent over the network may be relayed to each device.

Central controller 402 is generally configured to store programmed controls for motorized window covering assemblies 102 and/or other motorized window covering assemblies on shade network 400 based on the stored programmed controls, and log various system parameters of system 400. An exemplary central controller is the Model No. C156.271 of the INTELLIFLEX brand shade control system. The various system parameters logged by central controller 402 may include window covering movements and status, sensor readings and status, sensor levels based on threshold, switch and touchscreen overrides, software overrides, commands received from AV gateway 404, and/or changes to sensor thresholder among other system parameters. The programmed controls stored in central controller 402 may include a listing of window covering collections (a group of motorized window covering assemblies 102 and/or other motorized window covering assemblies on shade network 400), a listing of individual motorized window covering assemblies, a list of control zones, priority levels for the various components, and/or scheduling for controlling the various motorized window covering assemblies 102 and/or other motorized window covering assemblies on shade network 400. The priority levels of the various components determine which scheduled control signals will be overridden by other control signals provided in response to user inputs and/or sensor inputs.

For example, wall switch 410 and/or remote control 406 of system 400 can be used to override instructions and/or control signals being sent to motorized window covering assemblies 102 and/or other motorized window covering assemblies on shade network 400 from central controller 402. For instance, wall switch 410 and/or remote control 406 may provide control signals to motorized window covering assemblies 102 and/or other motorized window covering assemblies on shade network 400 requesting the respective window covering be moved to any position along its range of movement or to a preset location rather than a position or preset location previously or subsequently instructed by central controller 402. In various embodiments, wall switch 410 and/or remote control 406 may include one or more zones for controlling one or more collections of motorized window covering assemblies 102 and/or other motorized window covering assemblies on shade network 400. The one or more zones may include at least one actuator and/or at least one touch interface used to indicate a desired position for window coverings of motorized window covering assemblies 102 and/or other motorized window covering assemblies on shade network 400 in said zone. In an exemplary embodiment, wall switch 410 is either a single zone or a dual zone intelligent switch. A single zone intelligent switch is configured to provide control signals to a single motorized window covering assemblies 102 and/or other motorized window covering assemblies on shade network 400 or a single collection of window motorized window covering assemblies 102 and/or other motorized window covering assemblies on shade network 400, while a dual zone intelligent switch is configured to provide controls to two separate motorized window covering assemblies 102 and/or other motorized window covering assemblies on shade network 400, two separate collections of window covering passive devices 102. Wall switch 410 may be wired, such as shown in FIG. 7, and the network powers the wall switch 306 over low voltage network cable 300 from network ports 122 on power panel 104. Further, wall switch 410 may be wireless and battery powered.

Touchscreen 412 is configured to provide information about system 400 to a user in addition to allowing user override controls via actuators, touch interfaces, etc. In various embodiments, touchscreen 412 may be configured to display sensor data and/or other information as determined useful to an end user. Furthermore, touchscreen 412 may include a configuration or programming mode such that authorized users may adjust system programming from touchscreen 412.

Remote control 406 communicates with the rest of shade network 400 through wireless gateway 408 which includes an antenna to wirelessly communicate with handheld remote 406. AV gateway 404 may be connected to a projector or other audio-visual equipment and to monitor one or more characteristics of such equipment. For example, when a projector is turned on, AV gateway may send a command to lower window coverings in the room.

System 400 further includes sensors. Exemplary sensors of system 400 include exterior brightness sensor 430, wind sensor 432, and internal brightness sensor 434. Sensors 430, 432, and 434 may be programmed to transmit control signals that other devices, such as central controller 402, to override commands or control signals from other window covering active devices when values of one or more of sensors 430, 432, and 434 crosses a set threshold. In various embodiments, and as shown in illustrated system 400, the sensors may be coupled to the network through a sensor controller 440 (i.e., exterior brightness sensor 430 and wind sensor 432), or one of splitters 420 (i.e., internal brightness sensor 434). In addition, the sensors may either actively provide an indication by sending a sensor signal or passively provide an indication by making available a monitored characteristic, such as a voltage, a temperature, a pressure or other suitable characteristics.

System 400 includes motorized shades in addition to motorized window covering assemblies 102 which are powered by power panel 104. Motorized shades 450 are coupled to the network 400 through splitters 420 and receive power directly from the building power supply. An exemplary motorized shade 450 is Model No. C047.300 of the INTELLIFLEX brand shade control system. Motorized shades 450 include ports to receive low voltage network cable 300 and to communicate with power panel 104 with the RS-485 protocol over low voltage network cable 300.

Further, third party motorized shades 460 which do not include ports to receive low voltage network cable 300 may still be included as part of shade network 400, by connecting the motorized shades 460 to a motor controller 462 which in turn includes ports to receive low voltage network cable 300. Motor controller 462 is able to communicate with power panel 104 with the RS-485 protocol over low voltage network cable 300 and provide control signals to third party motorized shades 460. An exemplary motor controller 462 is Model No. C156.286 of the INTELLIFLEX brand shade control system.

Figure 10:
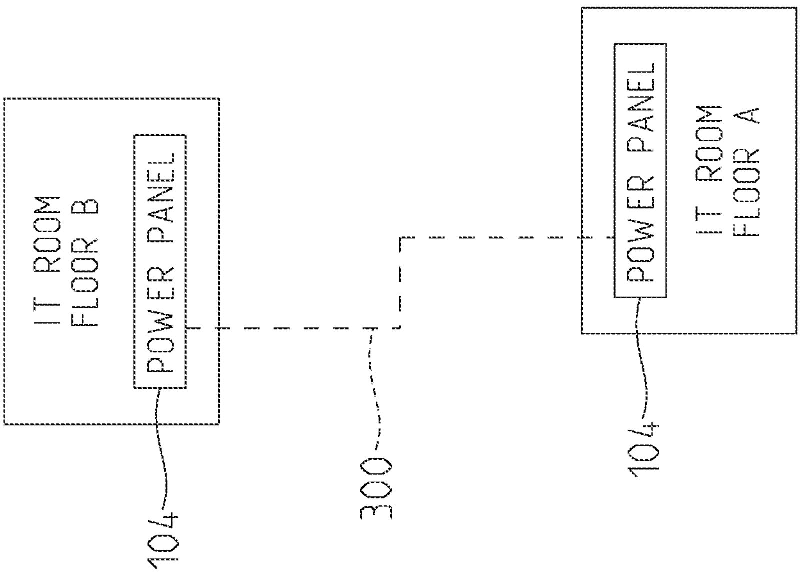
FIG. 10 illustrates an exemplary connection of power panels between floors in a building.
Figure 11:
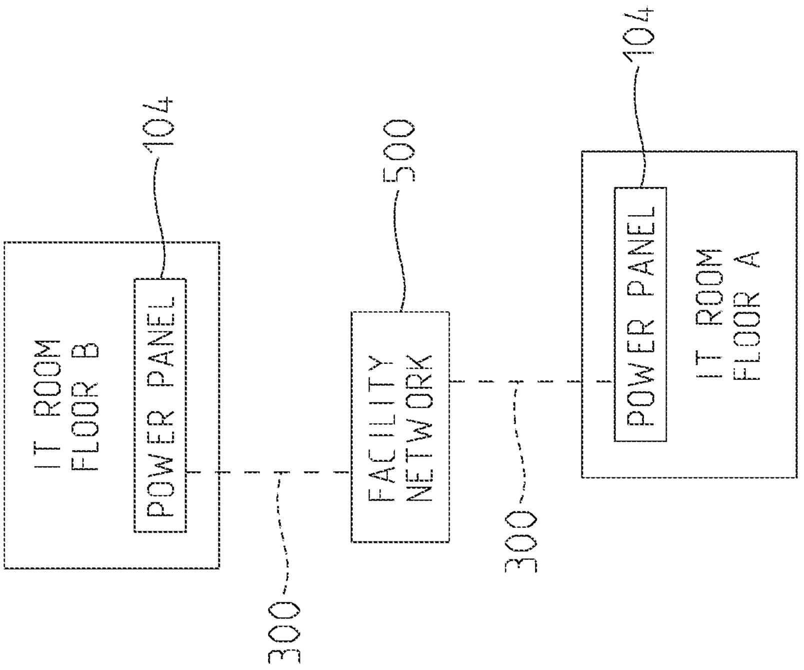
FIG. 11 illustrates another exemplary connection of power panels between floors in a building.

As shown in FIG. 1A, multiple power panel 104 may be mounted to the same standard rack 118. The multiple instances of power panel 104 may be connected to each other through low voltage network cable 300 plugged into the respective network ports 122 of the power panels 104. Further, power panels 104 on different floors of the building may be connected to each other through low voltage network cable 300 plugged into the respective network ports 122 of the power panels 104, as shown in FIG. 10. Alternatively, power panels 104 on different floors of the building may be connected to each other through low voltage network cable 300 plugged into the respective network ports 124 of the power panels 104 which couples the respective power panels 104 to facility network 500, as shown in FIG. 11.

In embodiments, network ports 122 of power panel 104 are powered at a first voltage level to provide power to the network components on shade network 400 and window covering output ports 120 of power panel 104 are powered at a second voltage level, higher than the first voltage level, to power the motors of motorized window covering assemblies 102. In embodiments, the second voltage level is too high for the network components on shade network 400 and if the network components are coupled to window covering output ports 120 by mistake then the network components 400 may be damaged if the second voltage level is provided. Controller 130 of power panel 104 may include logic to determine if a motorized window covering assembly 102 is plugged into a respective window covering output port 120 and if so, only then provide the second voltage level.

Figure 9:
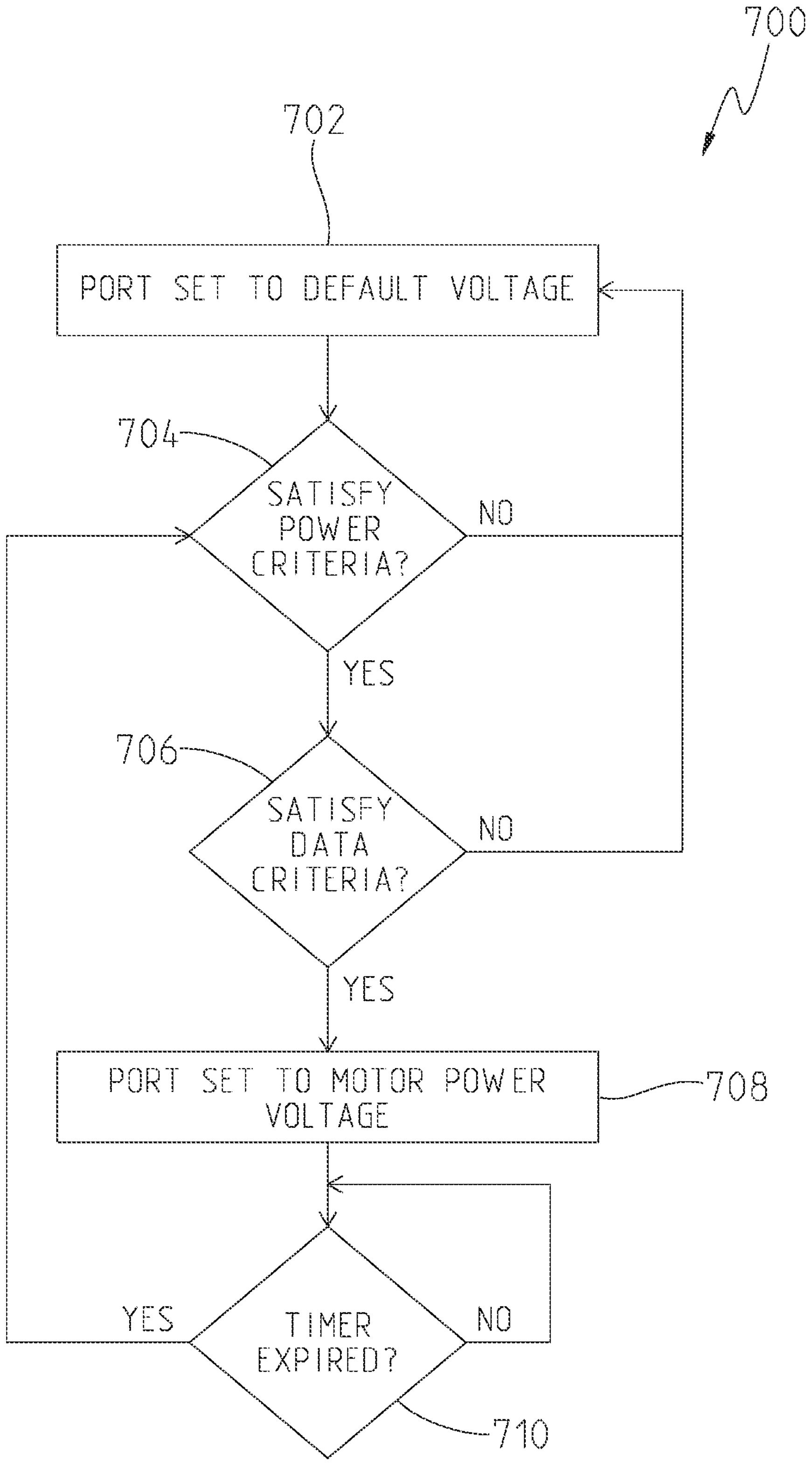
FIG. 9 illustrates an exemplary processing sequence of a controller of the power panel of FIG. 1.

Referring to FIG. 9, an exemplary processing sequence 700 of controller 130 to protect network components is shown. For each of window covering output ports 120 of power panel 104, the voltage provided on the power pins (pins 3-5 in FIG. 6) is set to a default voltage, as represented by block 702. In embodiments, the default voltage is the first voltage level used to power the network components on shade network 400. In one example, the first voltage level is 24 volts DC (VDC). For each port 120, controller 130 checks a power criteria as represented by block 704. If the port 120 satisfies the power criteria then processing sequence 700 continues to evaluate whether to set the voltage provided on the power pins to a higher motor power voltage. In one example, the motor power voltage is 36 volts DC (VDC). If the port does not satisfy the power criteria, then the voltage provided on the power pins remains at the default voltage. An exemplary power criteria is whether the connection is drawing power on pins 3-5 in FIG. 6 and returning on pins 6-8 in FIG. 6.

In embodiments, for each port 120, controller 130 checks a data criteria as represented by block 706. If the port 120 satisfies the data criteria then processing sequence 700 sets the voltage provided on the power pins to a higher motor power voltage, as represented by block 708. In one example, the motor power voltage is 36 volts DC (VDC). If the port does not satisfy the data criteria, then the voltage provided on the power pins remains at the default voltage. An exemplary data criteria is whether the connection is communicating RS-485 communications on pins 1 and 2 in FIG. 6.

In the illustrated embodiment, a given port 120 must satisfy both the power criteria and the data criteria to be set to the higher motor power voltage. In other embodiments, a given port 120 need only satisfy either the power criteria or the data criteria to be set to the higher motor power voltage. In embodiments, processing sequence 700 repeats the checks at a set time internal, such as once a second. In the illustrated embodiment, processing sequence 700 includes a timer, as represented by block 710.

Figure 12:
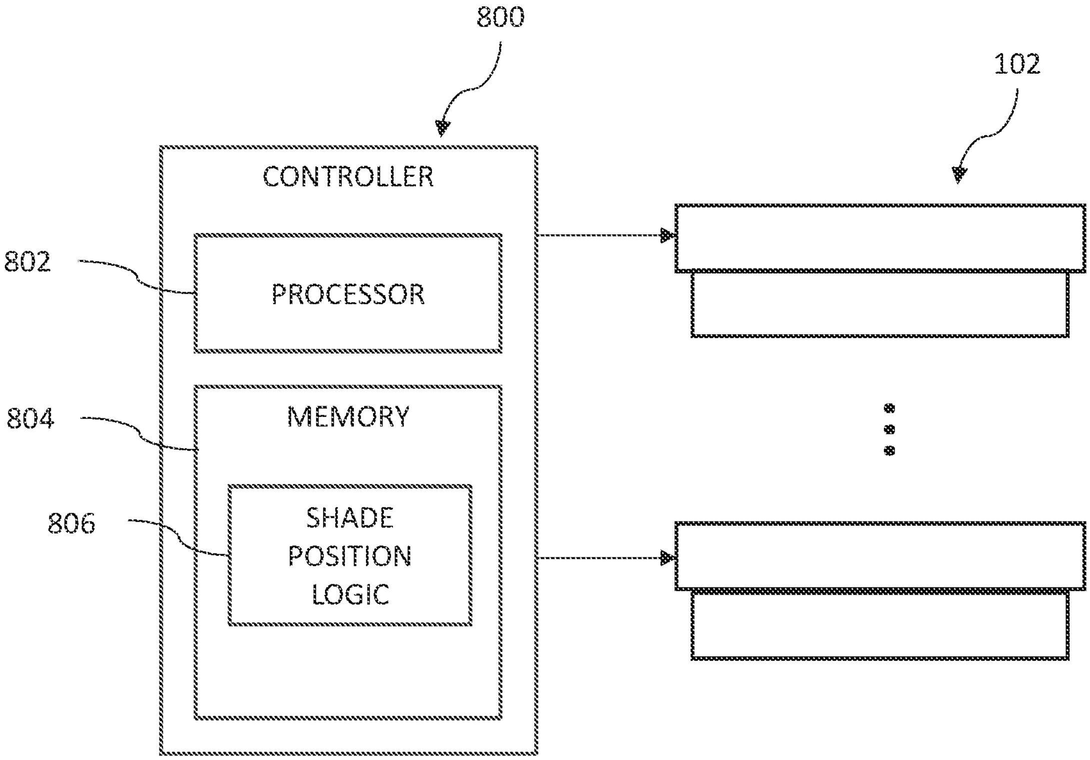
FIG. 12 illustrates a controller operatively coupled to a plurality of shades.

Referring to FIG. 12, an exemplary controller 800, which may be any of the control devices or controllers disclosed herein, or combinations thereof, including motorized window covering assemblies 102 themselves, includes at least one processor 802 and at least one memory 804 accessible by the at least one processor 802. Memory 804 includes shade position logic 806 which controls a position of the motorized window covering assemblies 102 of shade network 400 based on the one or more factors described herein.

Figure 13:
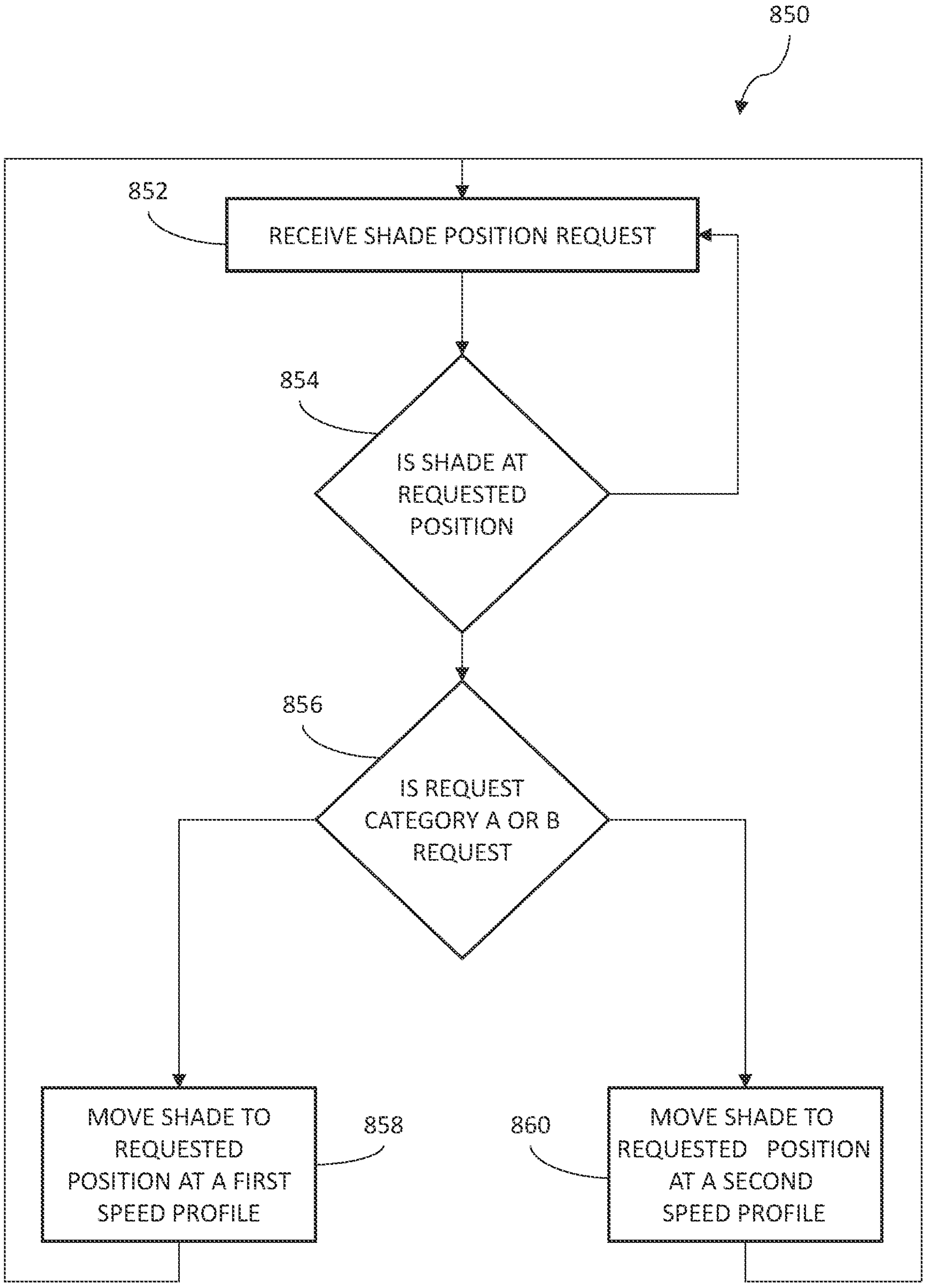
FIG. 13 illustrates an exemplary processing sequence of a shade position logic.

Referring to FIG. 13, an exemplary processing sequence 850 of shade position logic 806 is shown. Controller 800 receives a shade position request, as represented by block 852. In embodiments, the shade position request includes a requested position of one or more of motorized window covering assemblies 102. Exemplary requested positions include a percentage of range, for example 50% would correspond to a middle position between a lower position setpoint and an upper position setpoint, an actual position of a lower portion of the shade, a named user defined position (such as fully open, fully closed, or presentation), and other exemplary positions.

Controller 800 checks to see if the respective motorized window assembly 102 is at the requested position, as represented by block 854. If so, controller 800 waits for a subsequent shade position request. If not, controller 800 determines if the request is a category A or category B request, as represented by block 856. In embodiments, more than two categories may be provided. In embodiments, the request includes a flag which designates the request as category A or category B. In embodiments, based on the device initiating the request, controller 800 categorizes the request as either category A or category B. If the request is category A, controller 800 moves the respective motorized window assembly 102 at a first speed profile, as represented by block 858. If the request is category B, controller 800 moves the respective motorized window assembly 102 at a second speed profile, as represented by block 860. In embodiments, the first speed and the second speed correspond to rotational speeds of the respective motors 204 and not a movement speed of the bottom edge 224 of movable window covering 222 which would vary based on the position of movable window covering 222 on roller tube 218.

In embodiments, category A requests and category B requests are received from one of facility network 500 or shade network 400 after system 100 is setup and powered and are in response to one or more user or sensor inputs from system 100. In embodiments, the requests from shade network 400 originate from window covering active devices.

In embodiments, the first speed profile is less than the second speed profile. In embodiments, each of the first speed profile and the second speed profile are a generally constant speed and the second speed ratio is at least 5 times faster than the first speed ratio. In embodiments, the first category includes slow changing events, like sun tracking, and the second category includes fast changing events, like a meeting beginning with a projector.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system, comprising:

a plurality of low voltage network cables, each network cable having a first end, a second end, a plurality of electrical lines running from the first end to the second end, the plurality of electrical lines including a first number of power lines and a second number of data lines;

a plurality of motorized window covering assemblies, each of the plurality of motorized window covering assemblies including a window covering input port couplable with a respective one of the plurality of low voltage network cables, a moveable window covering having a plurality of positions, a drive system to move the moveable window covering to a respective one of the plurality of positions; and a motorized window covering controller which controls the drive system, the drive system including a DC motor and a DC-DC converter; and a power panel having a plurality of window covering output ports, the plurality of window covering output ports being couplable to the plurality of low voltage network cables such that a first low voltage network cable couples the window covering input port of a first motorized window covering to the power panel and a second low voltage network cable couples the window covering input port of a second motorized window covering to the power panel independent of the window covering input port of the first motorized window covering, wherein the power panel provides a first DC voltage greater than 24 volts to the first motorized window covering through a first group of connectors in a first window covering output port of the plurality of window covering output ports connected to the first number of power lines of the first low voltage network cable of the plurality of low voltage network cables, the DC-DC converter of the first motorized window covering receives a second DC voltage from the first number of power lines of the first low voltage network cable, the second DC voltage being lower than the first DC voltage, the DC-DC converter of the first motorized window covering provides a third DC voltage of about 24 volts to power the motor of the first motorized window covering, the second DC voltage being greater than the third DC voltage, a length of the first low voltage network cable being greater than 300 feet, and wherein the power panel provides instructions to the motorized window covering controller of the first motorized window covering through a second group of connectors in the first window covering output port of the plurality of window covering output ports connected to the first number of data lines of the first low voltage network cable of the plurality of low voltage network cables.

2. The system of any of claim 1, wherein the first voltage is about 36 volts.

3. The system of claim 1, wherein the second voltage has a first value corresponding to the length of the first low voltage network cable being a first length and a second value corresponding to the length of the first low voltage network cable being a second length, the second length being longer than the first length and the second value being less than the first value.

4. The system of claim 1, wherein the first number of power lines of the first low voltage network cable includes a plurality of pairs, the plurality of pairs being electrically coupled in parallel within the first motorized window covering.

5. The system of claim 4, wherein the plurality of pairs includes at least two pairs.

6. The system of claim 5, wherein the plurality of pairs includes three pairs.

7. The system of claim 6, wherein the first low voltage network cable includes eight lines.

8. The system of claim 7, wherein the first low voltage network cable is one of a CAT-5 cable and a CAT-6 cable.

9. A system, comprising:

a plurality of low voltage network cables, each network cable having a first end, a second end, a plurality of electrical lines running from the first end to the second end, the plurality of electrical lines including a first number of power lines and a second number of data lines, the first number being at least four;

a plurality of motorized window covering assemblies, each of the plurality of motorized window covering assemblies including a window covering input port couplable with a respective one of the plurality of low voltage network cables, a moveable window covering having a plurality of positions, a drive system to move the moveable window covering to a respective one of the plurality of positions; and a motorized window covering controller which controls the drive system, the drive system including a motor and a DC-DC converter; and a power panel having a plurality of window covering output ports, the plurality of window covering output ports being couplable to the plurality of low voltage network cables such that a first low voltage network cable couples the window covering input port of a first motorized window covering to the power panel and a second low voltage network cable couples the window covering input port of a second motorized window covering to the power panel independent of the window covering input port of the first motorized window covering;

wherein the power panel provides a first DC voltage to the first motorized window covering through a first group of connectors in a first window covering output port of the plurality of window covering output ports connected to the first number of power lines of the first low voltage network cable of the plurality of low voltage network cables, the DC-DC converter of the first motorized window covering receives a second DC voltage from the first number of power lines of the first low voltage network cable, the DC-DC converter of the first motorized window covering provides a third DC voltage lower than the second DC voltage to power the motor of the first motorized window covering;

wherein the power panel provides the first DC voltage to the second motorized window covering through a second group of connectors in a second window covering output port of the plurality of window covering output ports connected to the first number of power lines of the second low voltage network cable of the plurality of low voltage network cables, the DC-DC converter of the second motorized window covering receives a fourth DC voltage from the first number of power lines of the second low voltage network cable, the fourth DC voltage being less than the second DC voltage and higher than the third DC voltage, the DC-DC converter of the second motorized window covering provides the third DC voltage to power the motor of the second motorized window covering.

10. A system, comprising:

a plurality of motorized window covering assemblies, each of the plurality of motorized window covering assemblies including a moveable window covering having a plurality of positions and a drive system to move the moveable window covering to a respective one of the plurality of positions, the drive system including a motor; and a plurality of window covering active devices operatively coupled to the plurality of motorized window covering assemblies; and at least one controller operatively coupled to the plurality of window covering active devices and the plurality of motorized window covering assemblies; the at least one controller being configured to move a first movable window covering of a first motorized window covering assembly of the plurality of motorized window covering assemblies to a first position in response to a first input from a first window covering active device of the plurality of window covering active devices with a first constant speed of the motor of the first motorized window covering assembly and to move the first movable window covering of the first motorized window covering assembly of the plurality of motorized window covering assemblies to a second position in response to a second input from a second window covering active device of the plurality of window covering active devices with a second constant speed of the motor of the first motorized window covering assembly, the second constant speed being greater than the first constant speed.

11. The system of claim 10, wherein the first constant speed is a first rotational speed of the motor of the first motorized window covering assembly of the plurality of motorized window covering assemblies.

12. The system of claim 10, wherein the second constant speed is a second rotational speed of the motor of the first motorized window covering assembly of the plurality of motorized window covering assemblies.

13. The system of claim 10, wherein the second constant speed is at least five times greater than the first constant speed.

14. The system of claim 10, wherein the first input from the first window covering active device of the plurality of window covering active devices is based on an illumination level.

15. The system of claim 10, wherein the first input from the first window covering active device of the plurality of window covering active devices is based on a time of day.

16. The system of claim 10, wherein the first input from the first window covering active device of the plurality of window covering active devices is based on a sensor.

17. The system of claim 10, wherein the first input from the first window covering active device of the plurality of window covering active devices is based on a sun position.

18. The system of claim 10, wherein the second input from the second window covering active device of the plurality of window covering active devices is based on a presentation activation.

19. The system of claim 10, wherein the at least one controller is configured to move the first movable window covering of the first motorized window covering assembly of the plurality of motorized window covering assemblies to a third position in response to a third input from a third window covering active device of the plurality of window covering active devices, the third input including a flag which indicates a speed profile for the first motorized window covering assembly.

20. The system of claim 10, wherein the at least one controller is configured to move the first movable window covering of the first motorized window covering assembly of the plurality of motorized window covering assemblies to a third position in response to a third input from a third window covering active device of the plurality of window covering active devices, the at least one controller selects a speed profile for the first motorized window covering assembly based on the third window covering active device of the plurality of window covering active devices.

* * * * *